United States Patent Office 3,564,577
Patented Feb. 16, 1971

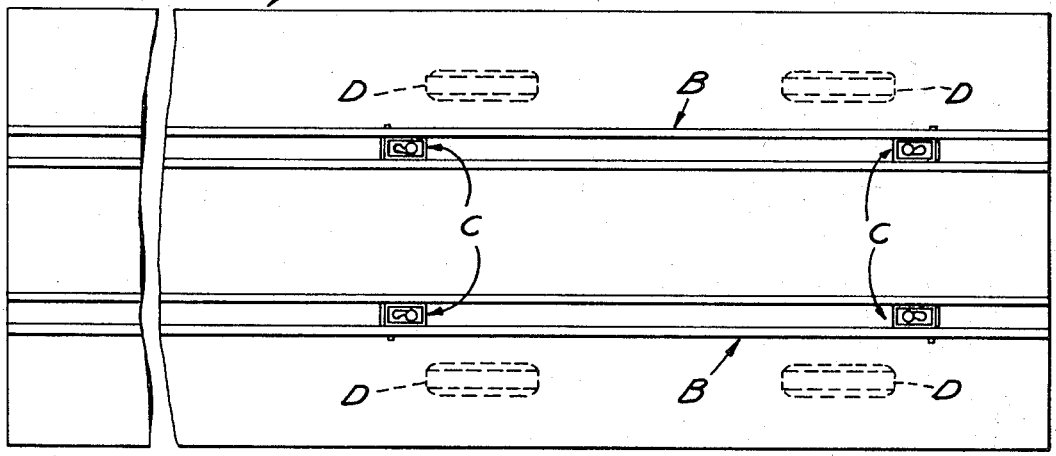
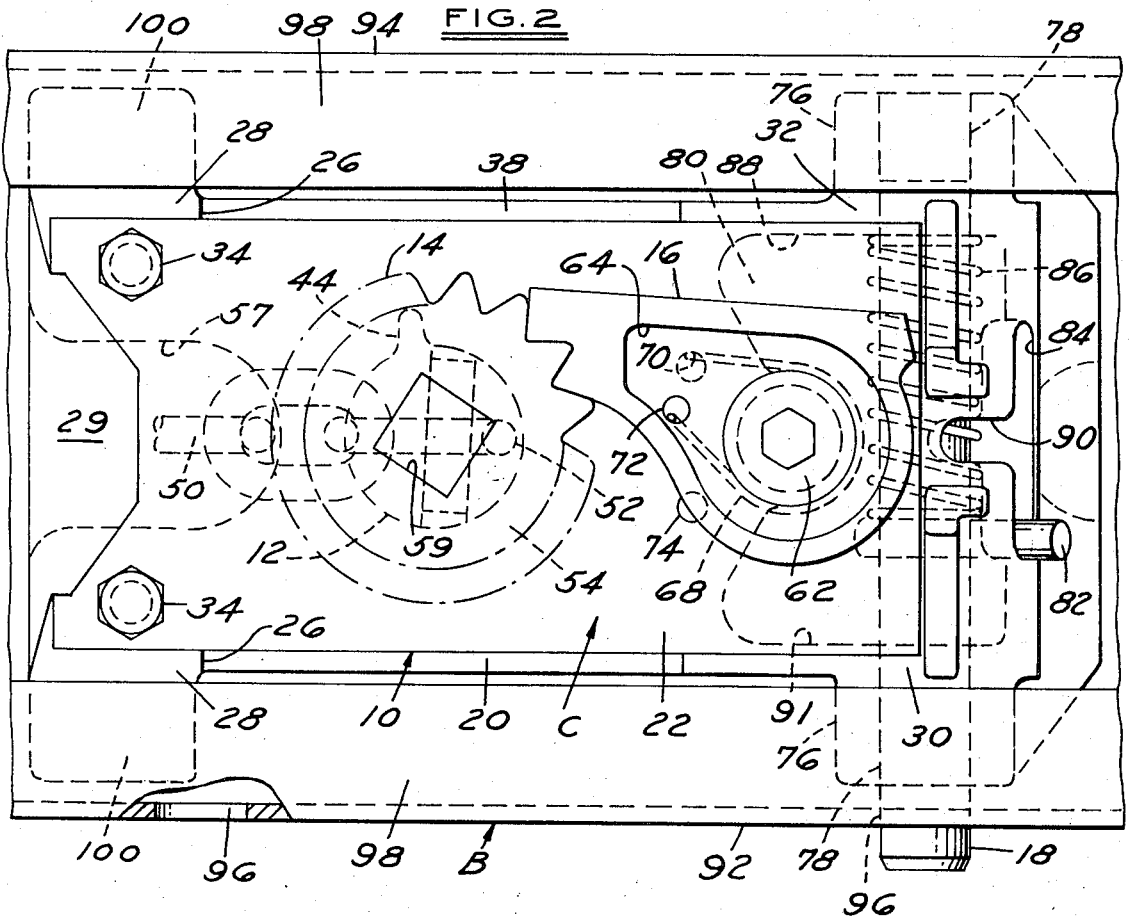

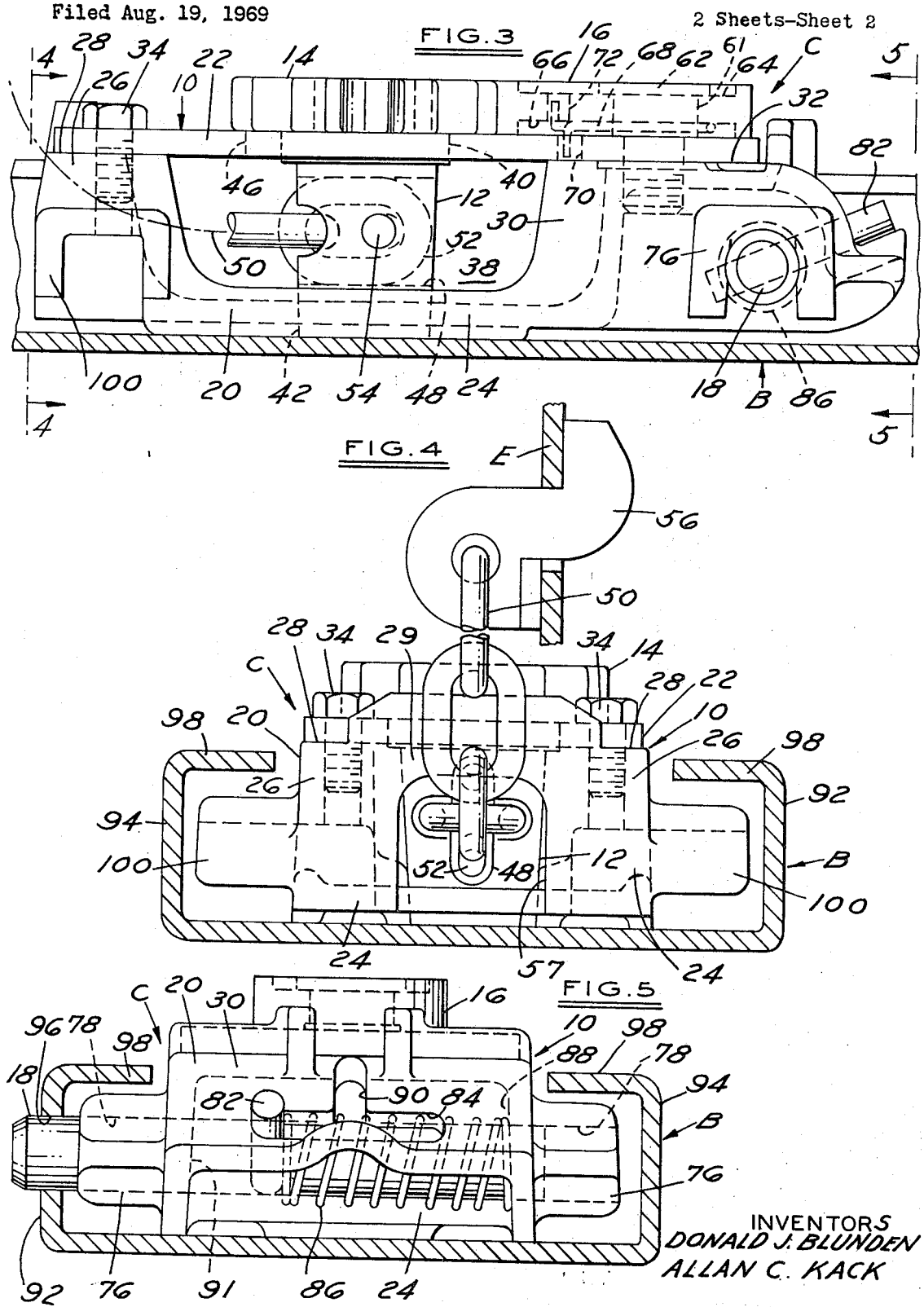

3,564,577
VEHICLE TIE-DOWN STRUCTURE
Donald J. Blunden, Southfield, and Allan C. Kack, Detroit, Mich., assignors to Whitehead & Kales Company, River Rouge, Mich., a corporation of Michigan
Filed Aug. 19, 1969, Ser. No. 851,209
Int. Cl. B61d 45/00; B60p 7/08
U.S. Cl. 105—369
4 Claims

ABSTRACT OF THE DISCLOSURE

A vehicle tie-down structure comprising a longitudinally extend rail adapted to be anchored lengthwise upon a longitudinally extending deck of a transport, and a carriage movable lengthwise of the rail. The carriage has a rotatable shaft upon which is wound a flexible element adapted to engage and hold a vehicle. A ratchet gear and pawl are provided for preventing rotation of the shaft in one direction, and a lock pin is provided for securing the carriage to the rail in longitudinally adjusted position.

SUMMARY OF THE INVENTION

One object of the invention is to provide a tie-down structure which is particularly designed for tying down vehicles having extremely low clearance.

Another object of the invention is to provide an improved, more efficient and compact tie-down structure for vehicles.

Another object is to provide a tie-down structure including a movable carriage in which the overall vertical dimension is reduced to a minimum.

Another object is to provide a carriage having a rotatable generally upright shaft upon which is wound a flexible element adapted to engage and hold a vehicle, and having a ratchet gear and pawl for preventing rotation of the shaft in one direction.

Another object is to provide a carriage in which the shaft is rotatable in a space beneath the top wall of the carriage, and the ratchet gear and pawl overlie the top wall and turn in a generally horizontal plane.

Another object is to provide a carriage construction of an improved and simplified design.

Another object is to provide a spring-pressed transverse lock pin to lock the carriage to the rail in longitudinally adjusted position, having a handle for manually retracting the lock pin, and means on the carriage body engageable with the handle to retain the lock pin in retracted position.

Other objects and features of the invention will become apparent as the description proceeds, especially when taken in conjunction with the accompanying drawings, wherein:

FIG. 1 is a fragmentary top plan view of a longitudinally extending elongated deck of a transport equipped with tie-down structure embodying our invention, and showing by dotted lines the positions of four ground-engaging wheels of one vehicle supported upon the deck.

FIG. 2 is an enlarged fragmentary top plan view of tie-down structure embodying our invention, with parts broken away and in section.

FIG. 3 is a side elevational view with portions of the rail broken away and in section to more clearly illustrate the carriage shown in FIG. 2.

FIG. 4 is a view partly in section and partly in elevation taken substantially on the line 4—4 in FIG. 3.

FIG. 5 is a view partly in section and partly in elevation taken substantially on the line 5—5 in FIG. 3.

Referring now more particularly to the drawings, A is a longitudinally extending elongated substantially flat horizontal deck of a transport, such for example as a railroad flat car, B are stationary main supporting channels or rails disposed in laterally spaced substantially parallel relation to each other and extending throughout substantially the entire length of the deck, and C are carriages that are within the main rails B at longitudinally spaced points thereof and are individually adjustable lengthwise of the rails.

Preferably the area of the deck A is such that it is capable of supporting thereon in tandem several vehicles of various sizes, i.e. vehicles having different lengths and/or widths. In the present instance, there is shown in FIG. 1 an outline of four ground-engaging wheels D of one of the vehicles mentioned.

The parallel main supporting rails B are rigidly secured to and serve effectively as reinforcements for the supporting deck A to prevent such deck from bending or buckling under the load of the vehicles thereon. Such main supporting rails B also serve as guides for the vehicles while they are being loaded onto or unloaded from the supporting deck A.

The adjustable carriages C are slidable lengthwise of and are supported by the main supporting rails B. Preferably, four adjustable carriages C are provided for typing down each vehicle and are arranged in transversely aligned pairs at longitudinally spaced points of the main supporting rails B (see FIG. 1).

Each adjustable carriage C includes a frame 10, a vertical stub shaft 12, a ratchet gear 14 secured to the upper end of the stub shaft 12, a ratchet pawl 16 adapted to engage the teeth of the ratchet gear and prevent rotation of the ratchet gear and stub shaft in one direction, and a transversely extending lock pin 18.

The carriage frame 10 comprises a body or casting 20 and a low, flat, horizontal top wall or plate 22. The body or casting 20 is an elongated member having a bottom wall or base 24 and laterally spaced upstanding portions 26 at one end which have flat horizontal top surfaces 28 connected by a bridge 29. The body 20 has a laterally extending upstanding portion 30 at the opposite end which has a flat horizontal top surface 32 in the plane of the top surfaces 28. The plate 22 rests upon the top surfaces 28 and 32 of the upstanding portions 26 and 30. Means such as the cap screws 34 which thread into the upstanding portions 26 secure the plate 22 on the body 20. The bottom wall 24, top plate 22 and upstanding portions 26 and 30 define a space 38 wherein the sides of the carriage are open between the upstanding portions as shown in FIGS. 1 and 2.

The vertical stub shaft 12 is disposed in the space 38 between the top plate 22 and the base 24 of the body 20 and has its ends journaled for rotation in the circular holes 40 and 42 in the top plate and base. A longitudinally extending rib 44 on the stub shaft 12 extending between plate 22 and base 24 prevents the stub sheaft from being accidentally removed from the carriage. However, a key slot 46 in plate 22 clears the rib 44 in one position of rotation of the stub shaft to permit the stub shaft to be assembled.

The stub shaft 12 has a vertically extending transverse slot 48 for receiving the end of a flexible linear element, here shown as a link chain 50, used in tying down the vehicle on the deck of the transport. As shown, the end link 52 of the chain is extended into the slot 48, and a retainer pin 54 extending across the slot 48 and secured in suitable holes in the stub shaft 12 extends through the end link 52 to secure the end of the chain. The opposite end of the chain has a hook 56 adapted to engage in a suitable opening in the frame E of the vehicle. The chain extends from the stub shaft 12 through a tunnel 57 between the upstanding portions 26 and beneath the bridge 29.

The ratchet gear 14 is integral with or secured to the upper end of stub shaft 12 so as to rotate as a unit with the stub shaft. The ratchet gear 14 has a polygonal slot 59 adapted to receive a suitable crank for rotating the ratchet gear and winding up the link chain 50 on stub shaft 12. The ratchet gear is disposed in a horizontal plane and overlies the plate 22. The ratchet pawl 16 prevents rotation of the ratchet gear 14 and hence the stub shaft 12 in one direction. The ratchet pawl is secured on the top of plate 22 in the same horizontal plane as the ratchet gear 14, being pivoted to the top plate for rotation about a vertical axis on the upper, enlarged cylindrical portion 61 of the screw 62 which threads into the upstanding portion 30 of body 20.

The pawl 16 has recessed top and bottom surfaces where indicated at 64 and 66. A spring 68 disposed in the lower recess 66 and extending around the enlarged portion 61 of screw 62 has one bent end extended into a hole 70 in the top plate 22 and the other bent end extended into a hole 72 in the pawl 16. Thus considering FIG. 2, the pawl is urged counterclockwise into engagement with the teeth of the ratchet gear 14, preventing the ratchet gear from rotating clockwise but permitting counterclockwise rotation thereof. The plate 22 will be seen to have a second hole 74. The second hole 74 is for use when the ratchet pawl 16 is turned over or reversed in assembly in order to prevent rotation of the ratchet gear 14 in the opposite direction, or counterclockwise. Thus when the pawl 16 is assembled on its opposite side, the spring 68 is received in recess 64 and one bent end of spring is received in the hole 74 of plate 22 rather than hole 70 so as to urge the pawl in a clockwise direction.

The lock pin 18 is an elongated cylindrical member which extends transversely of the carriage and is mounted on the carriage for rotation and for axial sliding movement. The casting 20 has a pair of aligned laterally outwardly extending bosses 76 which project from the upstanding portion 30 at one end of the body 20. The end portions of the lock pin 18 are slidably and rotatably received in aligned cylindrical passages 78 in the bosses 76 and the intermediate portion of the lock pin extends across the cavity 80 within the upstanding portion 30.

A handle in the form of a transverse pin 82 is secured to an intermediate portion of the lock pin 18 and extends through an elongated transverse slot 84 in the rear wall of the upstanding portion 30. A coil spring 86 encircles the lock pin and is compressed between the handle 82 and an interior side wall 88 of the cavity 80 so as to urge the lock pin 18 to its extended position as viewed in FIGS. 2 and 5 in which handle 82 engages the end of the slot. The slot 84 will be seen in FIGS. 2 and 5 to be generally T-shaped having an intermediate offset detent portion 90 for receiving the handle 82 when the lock pin is retracted and rotated, thereby retaining the lock pin in retracted position. It will be understood that lock pin 18 may be extended in the opposite direction by merely assembling the coil spring 86 on the lock pin between the handle 82 and the opposite interior side wall 91 of cavity 80. The opposite end of slot 84 would then, of course, determine the limit of the movement of the lock pin to its extended position. Normally, when the lock pin is reversed so as to project in the opposite direction, the pawl 16 is also reversed.

Referring again to the rails B, each rail has parallel upstanding side walls 92 and 94. The outer side wall 92 has a series of equally spaced holes 96 formed along the length thereof. The lock pin 18 is of a slightly smaller diameter than holes 96 so as to be free to enter one of the holes (see FIGS. 2 and 5) and lock the carriage against longitudinal movement.

The upstanding side walls 92 and 94 of the rails B terminate in horizontal inturned flanges 98 which overlie the bosses 76 of the carriage. It will be noted that the upstanding portions 26 of the carriage also have laterally outwardly extending bosses 100 generally similar to the bosses 76. The flanges 98 extend over the bosses 100 as well as the bosses 76 to prevent the carriages from lifting out of the rails.

In use, the vehicles to be transported are moved onto the deck A of the transport from one end thereof to be supported in tandem thereon. Depending upon the location of the carriages C relative to the ground-engaging wheels D of the vehicles after the latter are loaded, the respective carriages C may be moved lengthwise of the rails B to positions in spaced relation to the ground-engaging wheels D to enable the tie-down chains 50 to be extended upwardly at the proper angles for tie-down purposes. During this time, the lock pins 18 are in their retracted positions. When the carriages are properly located, the hooks 56 at the free ends of the tie-down chains 50 may be connected to suitable holes in the frames E of the vehicles, and the handles 82 may be removed from the detent portions 90 of the slots 84 to allow the coil springs 86 to snap the locking pins 18 to their extended positions through registering holes 96 in the rails B to lock the carriages C in adjusted positions. The stub shafts 12 may then be rotated by cranks (not shown) inserted in the polygonal slots 59 in the ratchet gears 14 to tighten or tension the tie-down chains 50 to tie down the vehicles. The build up of chain on shaft 12 in space 38 is horizontal, making it possible to hold the overall vertical height of the carriage down to a minimum. The chain space could be increased by lengthening and widening the carriage, although widening is not necessary where the sides of the carriage are open as in the embodiment disclosed. The ratchet gears 14 are rotated counterclockwise in FIG. 2 during tightening, and the ratchet pawls 16 prevent reverse rotation.

In order to release a vehicle, the lock pins 18 are retracted to release them from the holes 96 in the rails, as by striking the projecting ends of the lock pins with a mallet, permitting the carriages C to move in a direction to slacken the chains 50 and permit them to be released from the vehicle frames.

The carriages C have an overall vertical dimension which is reduced to a minimum so as to clear the vehicles being loaded and unloaded, even those vehicles with extremely low clearance.

What is claimed is:

1. A carriage for use in a vehicle tie-down structure, which structure includes a longitudinally extending channel adapted to be anchored lengthwise upon a longitudinally extending deck of a transport and having upright side walls one of which is provided with a plurality of longitudinally spaced openings and both of which have inturned flanges along their upper edges, said carriage being adapted to be carried by and movable lengthwise of the channel, said carriage comprising an elongated body having side portions adapted to extend under the inturned flanges of the side walls of the channel to prevent said carriage from lifting out of the channel, said body having a bottom wall, a low, substantially flat horizontal top plate spaced above said bottom wall, said body having upstanding portions adjacent the ends thereof extending upwardly from said bottom wall, said top plate being mounted on said upstanding portions, said bottom wall, top plate and upstanding portions defining a space therebetween wherein the sides of said carriage are open between said upstanding portions, a generally upright shaft in said space mounted for rotation on said bottom wall and top plate, said shaft extending upwardly through an opening in said top plate, said body having an aperture through one end thereof, a flexible element wound on said shaft in said space and adapted to extend through said aperture to engage and hold a vehicle, a ratchet gear fixed upon the upper end of said shaft for rotation therewith in a horizontal plane closely above said top plate, a ratchet pawl pivotally mounted on said top plate for turning movement in the same horizontal plane as said ratchet gear and engageable with the teeth of said ratchet gear to prevent rotation thereof in one direction, and a transverse lock pin axially slidably mounted on said body for movement between an extended position adapted to project through a selected opening in the one upright side wall of the channel to lock said carriage to the channel in longitudinally adjusted position and a retracted position so as to be withdrawn from the latter opening.

2. The carriage defined in claim 1, wherein two of said upstanding portions are provided in laterally spaced relation adjacent one end of said body having flat horizontal top surfaces upon which one end portion of said top plate is mounted and connected by a bridge, said laterally spaced upstanding portions and bridge defining said aperture through which said flexible element is adapted to extend from said shaft.

3. The carriage defined in claim 1, wherein spring means are provided for urging said lock pin to its extended position, and a handle extending from said lock pin for manually retracting the same.

4. The carriage defined in claim 3, wherein said body has a horizontal slot for guiding said handle during movement of said lock pin between its extended and retracted positions, said slot having a transverse extension providing a detent portion, and said lock pin being rotatable when in its retracted position to cause said handle to enter said detent portion and hold said lock pin from movement to its extended position.

References Cited

UNITED STATES PATENTS

| | | | |
|---|---|---|---|
| 1,634,350 | 7/1927 | Briggs | 105—369(AX) |
| 1,714,196 | 5/1929 | Vara | 105—369(AX) |
| 2,159,848 | 5/1939 | Gibbons | 280—179(.1) |
| 3,158,108 | 11/1964 | Sharp | 105—368(T) |
| 3,298,324 | 1/1967 | Schwiebert | 105—368(T) |
| 3,374,008 | 3/1968 | Blunden et al. | 105—368(T) |
| 3,391,907 | 7/1968 | Vogelsang | 254—150 |

DRAYTON E. HOFFMAN, Primary Examiner

U.S. Cl. X.R.

105—368